United States Patent Office 3,084,331
Patented Apr. 2, 1963

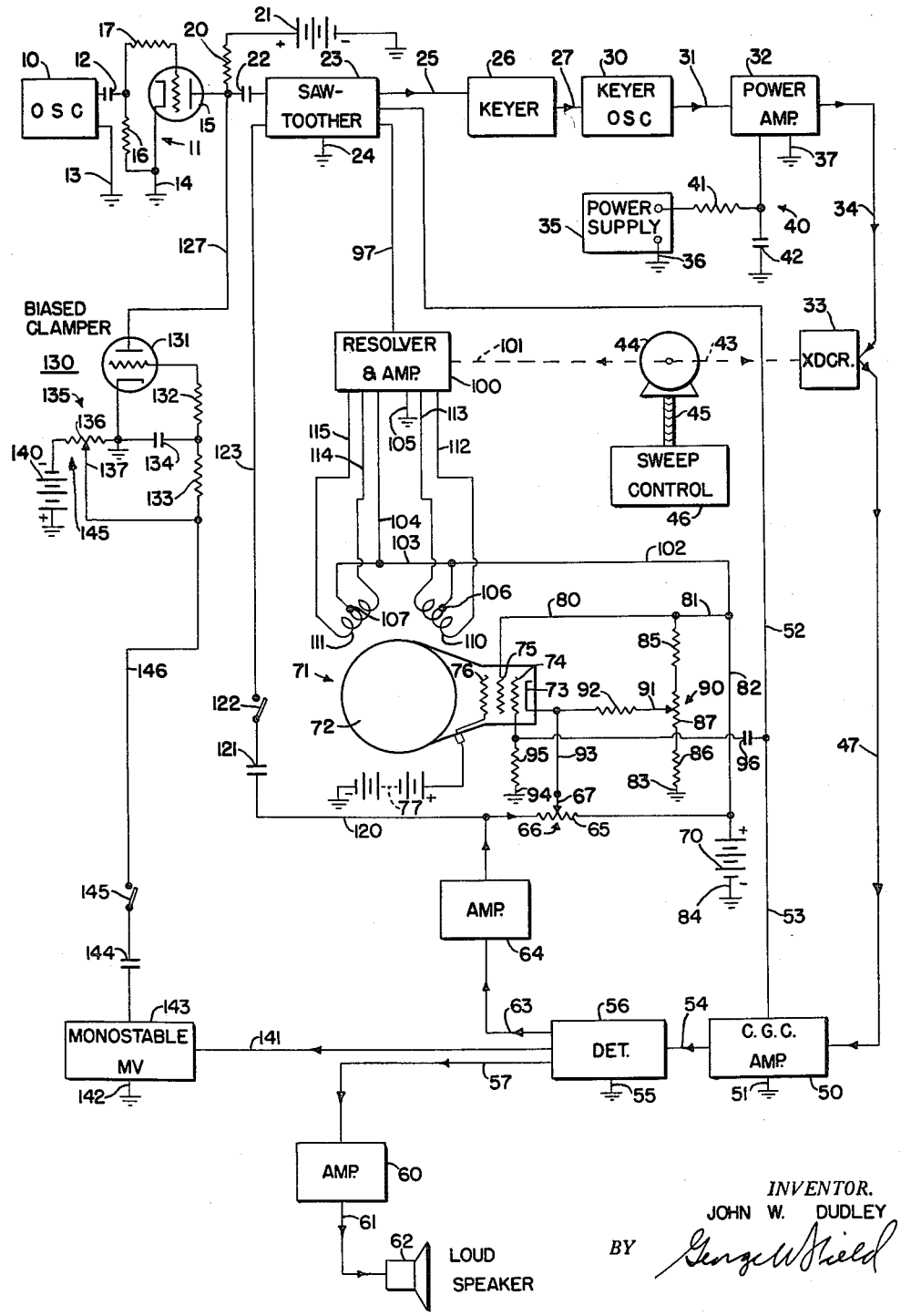

3,084,331
UNDERWATER SEARCH APPARATUS
John W. Dudley, Seattle, Wash., assignor to Minneapolis-Honeywell Regulator Company, Minneapolis, Minn., a corporation of Delaware
Filed May 28, 1956, Ser. No. 587,598
6 Claims. (Cl. 340—3)

This invention relates to the field of underwater sound apparatus, and more particularly to search sonar equipment for scanning a volume of water from a search point to determine the azimuth and range of remote reflecting surfaces located therein.

It is customary in search equipment to use a transducer giving a highly directional beam of compressional wave energy in the water, and to sweep the transducer in azimuth to scan a volume of water forward of a craft for example, means being provided to electrically energize the transducer with a series of pulses having an interpulse period selected to be equal to the round-trip travel time of sound in water for the maximum range at which reflections are to be expected. It is also customary to provide an indicator in the form of a cathode ray tube, the indication being in the form of a bright spot or pip at a distance, from some point on the face of the tube representing the search point or the location of the transducer, which is a measure of the range of any reflecting surface, and an azimuth, from some zero line on the face of the tube which represents the fore and aft axis of the craft, which is a measure of the azimuth of the reflecting surface of the craft.

In such apparatus it has heretofore been necessary to determine the amount of power to be used in energizing the transducer by considering the maximum range desired and the amount of "clutter" which can be tolerated on the indicator tube. Since the indicator sensitivity must be sufficient to detect reflections from maximum range, a certain amount of reverberation and surface reflection takes place and is indicated by an irregular light area near the center of the tube face. Clutter may be reduced either by reducing indicator sensitivity or by reducing power: either of course reduces maximum range.

A principal object of the invention is to improve search sonar equipment by a new combination of cyclic gain control in the indicator with power variation in accordance with pulse repetition frequency, accomplished by retriggering the apparatus energizing the transducer upon reception of each reflected pulse, varying the power with the resultant variation in pulse repetition frequency, and disabling the normal pulsing apparatus as long as retriggering pulses are being used.

Various other objects, advantages, and features of novelty not particularly enumerated above, which comprise my invention, are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

The single FIGURE of the drawing is a schematic showing of my improved search sonar equipment.

In the drawing a phase shift oscillator 10 is shown as energizing a square waver 11 through coupling capacitor 12 and ground connections 13 and 14. Square waver 11 is shown to comprise a triode 15, a grid resistor 16, a grid limiting resistor 17, and a plate resistor 20 connected to a source 21 of positive plate voltage. The output of square waver 11 is supplied through a coupling capacitor 22 and ground connections 14 and 24 to a sawtoother 23, and the arrangement is such that each time the plate of triode 15 goes more positive the output of the sawtoother is rapidly reduced to a minimum value, from which it increases steadily until the next positive pulse from square waver 15.

The output of sawtoother 23 is supplied through a connection 25 to a keyer 26, which acts through a connection 27 to control a keyed oscillator 30. While oscillator 10 preferably operates at a very low audio frequency, oscillator 30 preferably operates in the low radio frequency range. The output of oscillator 30 is supplied through a connection 31 to a power amplifier 32, and this in turn energizes the transducer 33 through a connection 34. Power for amplifier 32 is supplied by a power supply 35 through ground connections 36 and 37 and a network 40 including a resistor 41 and a capacitor 42. Elements 10 to 32 comprise a sonar transmitter.

Transducer 33 is positioned in azimuth by a shaft driven by a motor 44. Control of motor 44 is exercised through a cable 45 by a sweep control 46, which may be either manually operated or operated automatically to give a continuous oscillatory sweep of a desired angular extent about a normal direction which may be dead ahead.

Thus transducer 33 emits in a desired direction a pulse of low frequency compressional wave energy, and after an interval emits a second pulse. The length of the pulses is short compared to the interpulse period, so that for most of the time the transducer is not energized by amplifier 32, and is hence able to respond to compressional waves reflected from remote surfaces, providing pulses through a connection 47 to an amplifier 50. The output from sawtoother 23 is supplied as a bias to amplifier 50 on ground connections 24 and 51, and a connection 52, 53, so that at the instant when a pulse of compressional wave energy is being sent out by transducer 33, the gain of amplifier 50 is very low, while during the interpulse period the gain of amplifier 50 increases uniformly to a maximum value just as the next pulse is transmitted.

The output of amplifier 50 is supplied through a connection 54 and ground connections 51 and 55 to a detector 56 which supplies a first output through a connection 57, an amplifier 60, and a connection 61 to loudspeaker 62. Any equivalent device, such as headphones or a recorder, may be substituted for the loudspeaker according to the wishes of the user, but some auditory output is found very convenient to permit the user of the equipment to divert his visual attention to other matters when no reflecting surfaces are in the volume being scanned: when such a surface appears the resulting loudspeaker operation recalls the user's attention to the equipment.

The output of detector 56 is also supplied through a connection 63 to an amplifier 64 supplied with power, through the winding 65 of a voltage divider 66 having a slider 67, from a source 70. By this means the receiver pulses are supplied to a cathode ray tube 71 having a viewing screen 72, a cathode 73, a control grid 74, a focusing anode 75, and an accelerating anode 76 energized from the high voltage source 77. Focusing anode 75 is connected to source 70 through conductors 80, 81, and 82. There is also connected across source 70, by conductors 81 and 82 and ground connections 83 and 84, a voltage divider made up of fixed resistors 85 and 86 and the winding 87 of a voltage divider 90 having a slider 91 connected through a resistor 92 to cathode 73, which is also connected by a conductor 93 to slider 67. Control grid 74 is grounded at 94 through a resistor 95: cathode 73 is thus normally maintained positive with respect to grid 74, and the cathode ray tube is blanked. The output of sawtoother 23 is also supplied to grid 74 through conductor 52 and a capacitor 96, thus increasing the cut-off bias on the cathode ray tube at the instant of pulse transmission and decreasingly for an interval thereafter.

A further output is supplied on a conductor 97 from sawtoother 23 to the resolver of a resolver and amplifier 100. The resolver is positioned, in synchronism with transducer 33, by an extension 101 of shaft 43 of motor 44. Unit 100 is supplied with power from source 70 through conductors 82, 102, 103, and 104 and ground connections 105 and 84. Also connected to source 70 through conductors 103, 102, and 82 are the center taps 106 and 107 of the horizontal deflecting coil 110 and the vertical deflecting coil 111. The ends of these coils are connected to unit 100 through conductors 112, 113, 114, and 115.

The deflecting voltage varies linearly from a minimum value to a maximum value, since it is derived from sawtoother 23, and is resolved into rectangular components and supplied to coils 110 and 111. Therefore if the tube were unblanked the trace on the tube would be a straight line sweeping outwardly from some point on the screen of the tube for a distance proportional to the range of the equipment. If 360 degree scan is desired, the point of origin of the linear sweep will be the center of the screen. If it is desired to scan principally forward of the craft, the point of origin of the linear sweeps may be displaced downwardly by a suitable centering arrangement. Since the tube is only unblanked when the signal appears on slider 67 during driving cathode 73 negative, the actual signal on the tube face is a spot at a radial distance from the center point determined by the time required for the reflected pulse to travel to the reflecting surface and return, and at an azimuth determined by the rotated position of the transducer.

The foregoing brief description of the prior art gives the setting in which my improvement operates. The improvement includes first a connection from amplifier 64 through conductor 120, capacitor 121, switch 122, and conductor 123, and through ground connections 24 and 84, to sawtoother 23. When switch 122 is closed the positive going trailing charges of any reflected pulse output from amplifier 64 retriggers sawtoother 23, curtailing the interpulse period immediately. To this end capacitor 121 is so chosen as to have a differentiating effect.

The values for resistor 41 and capacitor 42 at power supply 35 are so chosen that in the normal interpulse period the capacitor can recharge substantially fully. If the pulse repetition rate increases however, the capacitor discharges more frequently to energize the power amplifier, and the charging interval for the capacitor is reduced. Accordingly the voltage supplied to amplifier 32 decreases, and thus the power of the radiated pulses varies inversely to the pulse repetition frequency.

A further refinement has been found desirable. Under some circumstances a double firing of sawtooth 23 might take place, once from the retriggering pulse and once from the square waver. To avoid this possibility a biased clamper 130 is connected to the anode of triode 15 by connection 127. Clamper 130 is shown to comprise a triode 131, a pair of resistors 132, 133, a bypass capacitor 134, a voltage divider 135 having a winding 136 and a slider 137, and a source 140 of bias voltage.

A further output from detector 56 is supplied on a connection 141 and ground connections 142 and 55 to a monostable multivibrator 143, whose output is supplied through capacitor 144, switch 145, and connection 146 to clamper 130. The recovery time of multivibrator 143 is substantially the same as the period of oscillator 10.

Operation

The operation of the conventional system including elements 10 to 115 is as follows. The sweep control 46 is set to give a desired sweep pattern, for example, a 180 degree oscillating sweep centered on dead ahead. Oscillator 10 operates at a frequency of for example 1.5 cycles per second, and voltage of this frequency is supplied through capacitor 12 to square waver 11, which acts as an overdriven amplifier. A square wave voltage appears on the plate of triode 15. At the beginning of each positive going half cycle of the square wave, sawtoother 23 is triggered and its output rapidly drops to a minimum value. This wave front in turn triggers keyer 26 to key oscillator 30, so the oscillator emits a pulse of energy at a frequency of for example 175 kilocycles: the pulse length may be one millisecond or so. The oscillator output is amplified in amplifier 32, discharging capacitor 42 at a rate higher than that at which the capacitor can charge through resistor 41. When the keyed pulse ceases amplifier 32 becomes inoperative, and capacitor 42 charges through resistor 41. The pulse energy has been supplied to transducer 33, and a pulse of compressional waves is projected from the transducer in a direction lying along the axis thereof. The cyclic gain control signal for sawtoother 23 applied to amplifier 50 through connections 52 and 53 maintains the gain of the amplifier so low during transmission of the pulse that little or no sound is heard from loudspeaker 62, and similarly cathode ray tube 71 is substantially blanked so that little or no light appears on the tube face at the search point representative of the location of the vessel. The output of sawtoother 23 is also fed to the resolver in unit 100 and deflection coil currents flow to produce a changing deflection field which, if the tube were not blanked, would sweep the beam outwardly from the search point in a direction determined by the direction of the transducer.

If no reflecting surface is encountered by the compressional waves within the design maximum range of the equipment a second cycle of oscillator 10 reenergizes square waver 15 to trigger sawtoother 23 for a second cycle, and this operation continues as long as no reflecting surface appears. When one does appear the reflected compressional wave pulse reaches transducer 33, which converts it to electrical energy impressed on the amplifier 50. It will be appreciated that the interval between the transmission of the pulse and reception of the reflection, as well as the intensity of the reflection, both depend on the distance to the reflecting surface. After detection the received pulse is presented as an audible sound by loudspeaker 62, and also appears on slider 67 as a negative going voltage which unblanks the cathode ray tube. The cathode ray impinges on the tube face 72 at a point determined in angular and radial displacement by the field set up by coils 110 and 111, giving a spot on the screen. Unless there are further echoes from more distant surfaces in the same direction, nothing further happens until the oscillator 10 commences a new cycle of operation.

The interval from the time the first reflection is received until oscillator 10 begins a new cycle is an inoperative one, since the first reflection is always the one of interest. When switch 122 is closed this defect is eliminated: now when a reflected pulse is received its leading edge unblanks tube 71, and operates loudspeaker 62, as before, but its trailing edge is differentiated in capacitor 121 and the resulting positive pulse is supplied to sawtoother 23, which it retriggers at once without waiting for the normal completion of the cycle of oscillator 10. This results in immediate transmission of a pulse from transducer 33, but since capacitor 42 has not had its normal charging interval the voltage available to amplifier 32 is less than normal and the transmitted power is accordingly reduced. The nearer the reflecting surface is, the greater will be the changes in pulse repetition frequency and transmitted power.

This is obviously advantageous. The nearer a craft is to a reflecting surface such as a shoreline, the more important it is that clear definition of the surface be available, while for a distant shoreline a more discontinuous indication of outline will suffice. Likewise, the nearer a craft is to a reflecting surface, the less power is required to give a reliable reflecting signal, and if the power can reduce the level of reverberation, surface reflection, and general clutter goes down at the same time, making it easier to observe the meaningful signals.

There is a further advantage when the indicator is equipped with a cyclic gain voltage, which cooperates with the reduced power and increased pulse repetition frequency to reduce clutter and to discriminate against second reflections from surfaces further from the craft than the first reflecting surface.

If in the apparatus thus far described a reflecting surface is located at about half the full range of the apparatus from the craft, the sawtoother is receiving alternate pulses from square waver 15 and amplifier 64 at about equal intervals. To avoid any double triggering, clamper 130 and multivibrator 143 are provided. The trailing edge of the pulse from detector 56 triggers multivibrator 143, which supplies a positive pulse to clamper 130, causing triode 131 to fire and clamping the voltage at the plate of triode 15. When the negative half cycle of oscillator 10 occurs the plate potential would ordinarily rise to give a positive trigger pulse to sawtoother 23, but because of clamper 130 this cannot happen and accordingly a pulse from oscillator 10 is essentially suppressed. The release time of multivibrator 143 is such, however, that if no reflected pulse appears within about one cycle of oscillator 10, the multivibrator returns to its normal condition, clamper 130 is again biased to cut-off, and control of sawtoother 23 is returned to oscillator 10 until reflected pulses once more are available. With this arrangement not more than one pulse from oscillator 10 is ordinarily missed upon failure of reflected pulses.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of size, shape and arrangement of parts, within the principle of the invention, to the full extent indicated by the broad general meaning of the terms in which the appended claims are expressed.

I claim as my invention:

1. Search sonar apparatus comprising, in combination: a directional sonar transducer; transmitting means connected to said transducer for causing emission of a series of energy pulses having an interpulse period selected according to the maximum desired range of the apparatus; an indicator having a display field; receiving means connected to said transducer and said indicator for causing indications to appear at displacements from the center of said field determined by the distances between said transducer and any remote reflecting surfaces; means connected to said transducer and said indicator for varying the direction of transmission of said pulses and simultaneously varying the azimuth of the indications on said field; retriggering means interconnecting said receiving means and said transmitting means for curtailing an interpulse period and causing immediate transmission of the next suceeding pulse upon reception of a reflection of a previous pulse from a remote surface, so that the pulse repetition frequency and hence the density of indications on said indicator vary in accordance with said distance; means connected to said transmitting means for varying the transmitted power as an inverse function of said pulse repetition frequency; and means connected to said transmitting means and said receiving means for preventing normal operation of said transmitting means, for an interval related to the normal interpulse period, concurrently with the curtailment of the interpulse period.

2. Search sonar apparatus comprising, in combination: a directional sonar transducer; transmitting means connected to said transducer for causing emission of a series of energy pulses having an interpulse period selected according to the maximum desired range of the apparatus; an indicator having a display field; receiving means connected to said transducer and said indicator for causing indications to appear at displacements from the center of said field determined by the distances between said transducer and any remote reflecting surfaces; means connected to said transducer and said indicator for varying the direction of transmission of said pulses and simultaneously varying the azimuth of the indications on said field; retriggering means interconnecting said receiving means and said transmitting means for curtailing an interpulse period and causing immediate transmission of the next succeeding pulse upon reception of a reflection of a previous pulse from a remote surface, so that the pulse repetition frequency and hence the density of indications on said indicator vary in accordance with said distance; and means connected to said transmitting means and said receiving means for preventing normal operation of said transmitting means, for an interval substantially equal to the normal interpulse period, concurrently with the curtailment of the interpulse period.

3. Search sonar apparatus comprising, in combination: a directional sonar transducer; transmitting means connected to said transducer for causing emission of a series of energy pulses having an interpulse period selected according to the maximum desired range of the apparatus; an indicator having a display field; receiving means connected to said transducer and said indicator for causing indications to appear at displacements from the center of said field determined by the distances between said transducer and any remote reflecting surfaces; means connected to said transducer and said indicator for varying the direction of transmission of said pulses and simultaneously varying the azimuth of the indications on said field; retriggering means interconnecting said receiving means and said transmitting means for curtailing an interpulse period and causing immediate transmission of the next succeeding pulse upon reception of a reflection of a previous pulse from a remote surface, so that the pulse repetition frequency and hence the density of indications on said indicator vary in accordance with said distance; and means connected to said transmitting means and said receiving means for preventing normal operation of said transmitting means, for an interval related to the normal interpulse period, concurrently with the curtailment of the interpulse period.

4. Search sonar apparatus comprising, in combination: a directional sonar transducer; transmitting means connected to said transducer for causing emission of a series of energy pulses having an interpulse period selected according to the maximum desired range of the apparatus; an indicator having a display field; receiving means connected to said transducer and said indicator for causing indications to appear at displacements from the center of said field determined by the distances between said transducer and any remote reflecting surfaces; means connected to said transducer and said indicator for varying the direction of transmission of said pulses and simultaneously varying the azimuth of the indications on said field; retriggering means interconnecting said receiving means and said transmitting means for curtailing an interpulse period and causing immediate transmission of the next succeeding pulse upon reception of a reflection of a previous pulse from a remote surface, so that the pulse repetition frequency and hence the density of indications on said indicator vary in accordance with said distance; and means connected to said transmitting means for varying the transmitted power as an inverse function of said pulse repetition frequency.

5. Search sonar apparatus comprising, in combination: a directional sonar transducer; transmitting means connected to said transducer for normally causing emission of a series of energy pulses having a normal interpulse period determined by the maximum desired range of the apparatus; an indicator having a display field of substantial area; receiving means connected to said transducer and said indicator for causing indications to appear on said field at displacements from a selected point thereon determined by the distances between the transducer and any reflecting surfaces; means connected to said transducer and said indicator for varying the direction of transmission of said pulses and simultaneously varying the azimuth of any indications on said field; retriggering means interconnecting said receiving means and said transmitting means to curtail an interpulse period and cause immediate transmission of the next succeeding pulse upon reception of the first reflection of a previously transmitted pulse, so that the pulse repetition frequency and hence the density of indications on said field vary in accordance with said distance; means connected to said transmitting means for varying the transmitted power as an inverse function of said pulse repetition frequency; and means connected to said receiving means and said transmitting means for varying the gain of said receiving means in a cycle having a period equal to said interpulse period, so that said gain is small at the instant said pulse is transmitted and increases throughout the interpulse period.

6. Search sonar apparatus comprising, in combination: a directional sonar transducer; a transmitter connected to said transducer for causing emission of energy at an ultrasonic frequency; means keying said transmitter to cause said emission to take the form of energy pulses at said ultrasonic frequency; signal generating means connected to supply first positive signal pulses to said keying means to cause operation thereof with a period selected in accordance with the maximum desired range of the apparatus; receiving means connected to said transducer and said keying means for giving a second positive pulse upon reception of any reflection of a transmitted pulse to terminate the interpulse period and initiate transmission of a new pulse; and means including a biased clamper connected to said signal source and said receiving means for energization with each said second positive pulse to prevent any first positive pulse from keying said transmitter for an interval corresponding in length to said interpulse period.

References Cited in the file of this patent

UNITED STATES PATENTS

| | | |
|---|---|---|
| 2,428,799 | Hayes | Oct. 14, 1947 |
| 2,473,974 | Schuck | June 21, 1949 |
| 2,502,938 | Fryklund | Apr. 4, 1950 |
| 2,530,418 | Alvarez | Nov. 21, 1950 |
| 2,542,983 | Beatty | Feb. 27, 1951 |
| 2,566,858 | Sebring | Sept. 4, 1951 |
| 2,946,050 | Wathen | July 19, 1960 |

FOREIGN PATENTS

| | | |
|---|---|---|
| 1,121,949 | France | May 14, 1956 |